United States Patent
Laddu

(10) Patent No.: US 12,489,591 B2
(45) Date of Patent: Dec. 2, 2025

(54) TBS INDICATION AND CQI REPORTING FOR LOWER BLER TARGETS

(71) Applicant: Nokia Technologies Oy, Espoo (FI)

(72) Inventor: Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 441 days.

(21) Appl. No.: 18/006,282

(22) PCT Filed: Jul. 27, 2021

(86) PCT No.: PCT/EP2021/070914
§ 371 (c)(1),
(2) Date: Jan. 20, 2023

(87) PCT Pub. No.: WO2022/028942
PCT Pub. Date: Feb. 10, 2022

(65) Prior Publication Data
US 2023/0224135 A1    Jul. 13, 2023

Related U.S. Application Data

(60) Provisional application No. 62/706,311, filed on Aug. 7, 2020.

(51) Int. Cl.
*H04W 72/04* (2023.01)
*H04L 5/00* (2006.01)
(Continued)

(52) U.S. Cl.
CPC .......... *H04L 5/0092* (2013.01); *H04L 5/0057* (2013.01); *H04W 28/06* (2013.01); *H04W 72/04* (2013.01); *H04W 72/232* (2023.01)

(58) Field of Classification Search
None
See application file for complete search history.

(56) References Cited

U.S. PATENT DOCUMENTS 11,337,163 B2 *   5/2022   Cirik ................... H04W 52/248
11,627,597 B2 *   4/2023   Khoshnevisan ...... H04L 1/1887
                                                                370/329
(Continued)

FOREIGN PATENT DOCUMENTS

CN       111294948 A     6/2020
WO    2019/028879 A1     2/2019

OTHER PUBLICATIONS

"3rd Generation Partnership Project; Technical Specification Group Radio Access Network; NR; Physical layer procedures for data (Release 16)", 3GPP TS 38.214, V16.1.0, Mar. 2020, pp. 1-151.
(Continued)

Primary Examiner — Willie J Daniel, Jr.
(74) Attorney, Agent, or Firm — Carter, DeLuca & Farrell LLP

(57) ABSTRACT

A method, apparatus, and a computer-readable storage medium are provided for improved transport block size (TBS) indication and channel quality indicator (CQI) reporting for lower target block error ratios (BLERs). In an example implementation, the method may include a user equipment configuring a plurality of transport block sizes, activating one or more transport block sizes of the plurality of transport block sizes, and determining a first transport block size from an indication received from a network node when more than one transport block sizes of the one or more transport block sizes are activated. The method may further include determining, a second transport block size, the second transport block size determined based at least on the one or more transport block sizes that are activated and the first transport block size, and receiving a downlink trans-
(Continued)

mission from the network node with the second transport block size. In an additional example implementation, the method may include a user equipment determining a channel quality indicator based at least on a physical downlink shared channel received from a network node and transmitting the channel quality indicator to the network node.

1 Claim, 8 Drawing Sheets

(51) Int. Cl.
*H04W 28/06* (2009.01)
*H04W 72/232* (2023.01)

(56) References Cited

U.S. PATENT DOCUMENTS

| | | | |
|---|---|---|---|
| 12,273,888 B2 * | 4/2025 | Lee | H04L 5/0051 |
| 2017/0054518 A1 | 2/2017 | Cho | |
| 2019/0150016 A1 | 5/2019 | Kittichokechai et al. | |
| 2019/0215095 A1 | 7/2019 | Park | |
| 2019/0305911 A1 | 10/2019 | Sarkis et al. | |
| 2019/0349116 A1 | 11/2019 | Hosseini et al. | |
| 2020/0052861 A1 | 2/2020 | Li et al. | |
| 2020/0112357 A1 | 4/2020 | Fakoorian et al. | |
| 2020/0153543 A1 | 5/2020 | Khoshnevisan et al. | |
| 2022/0045783 A1 | 2/2022 | Pedersen et al. | |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"Discussion on TBS determination", 3GPP TSG RAN WG1 Meeting #90, R1-1713187, Agenda: 6.1.3.3.1.3, LG Electronics, Aug. 21-25, 2017, 3 pages.

"CQI reporting for multiple services in NR", 3GPP TSG RAN WG1 #91, R1-1719584, Agenda: 7.2.2.5, MediaTek Inc, Nov. 27-Dec. 1, 2017, 6 pages.

Invitation to Pay Additional Fees received for corresponding Patent Cooperation Treaty Application No. PCT/EP2021/070914, dated Oct. 25, 2021, 10 pages.

International Search Report and Written Opinion received for corresponding Patent Cooperation Treaty Application No. PCT/EP2021/070914, dated Dec. 21, 2021, 18 pages.

Office Action received for corresponding European Patent Application No. 21749808.8, dated May 23, 2025, 8 pages.

* cited by examiner though aspects of 3GPP and other standards and use of certain vocabulary relating thereto are provided herein, the subject matter described herein is not limited to such examples and embodiments, and such example embodiments and descriptions are provided to illustrate various example implementations. For example, any vocabulary used herein is not intended to be limiting and terms used herein may be freely substituted for terms of equivalent or similar meaning and understanding within the scope of the subject matter described herein.

TBS INDICATION AND CQI REPORTING FOR LOWER BLER TARGETS

RELATED APPLICATION

This application claims priority to PCT Application No. PCT/EP2021/070914, filed on Jul. 27, 2021, which claims priority to U.S. Provisional Application No. 62/706,311, filed on Aug. 7, 2020, each of which is incorporated herein by reference in its entirety.

TECHNICAL FIELD

This description relates to wireless communications, and in particular, ultra reliable low latency communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra reliable low latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

A method, apparatus, and a computer-readable storage medium are provided for improved transport block size (TBS) indication and channel quality indicator (CQI) reporting for lower target block error ratios (BLERs).

In an example implementation, the method may include a user equipment configuring, at the user equipment, a plurality of transport block sizes; activating, at the user equipment, one or more transport block sizes of the plurality of transport block sizes; and determining, at the user equipment, a first transport block size from an indication received from a network node when more than one transport block sizes of the one or more transport block sizes are activated. The method may further include determining, at the user equipment, a second transport block size, the second transport block size determined based at least on the one or more transport block sizes that are activated and the first transport block size; and receiving, at the user equipment, a downlink transmission from the network node with the second transport block size.

In an additional example implementation, the method may include a user equipment determining, at the user equipment, a channel quality indicator based at least on a physical downlink shared channel received from a network node; and transmitting, by the user equipment, the channel quality indicator to the network node.

In an additional example implementation, the method may include a network node transmitting, from the network node, a transport block size configuration to a user equipment, the transport block size configuration including a plurality of transport block sizes to be configured at the user equipment; and sending, by the network node, an activation message to the user equipment, the activation message activating one or more transport block sizes of the plurality of transport block sizes. The method may further include transmitting, by the network node, an indication to the user equipment; and receiving, by the network node, a channel quality indicator from the user equipment, the channel quality indicator determined at the user equipment based at least on the one or more transport block sizes activated at the user equipment and the indication transmitted to the user the equipment.

DETAILED DESCRIPTION

Figure 1:
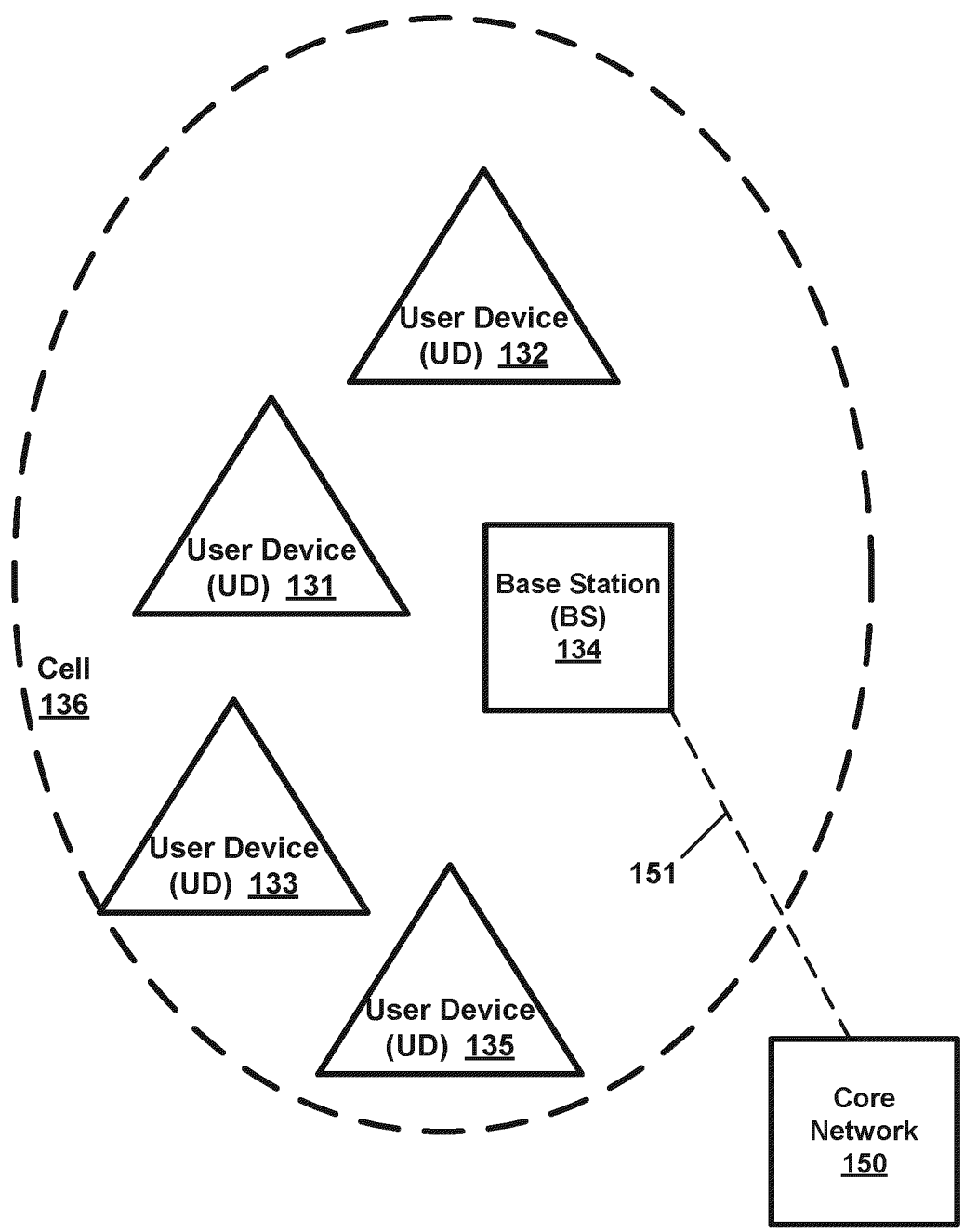
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In NR, the objective of a transport block size (TB S) determination procedure is to minimize the error between a target code rate (of a modulation and coding scheme, MCS) and effective code rate (e.g., code rate a TB receives with allocated PRBs). However, for NR, the scheduling of a given TBS can be performed only with a few combinations of resource allocation and MCS. That is, arbitrary selections of resource allocation with a given MCS by the network are not allowed. This causes problems in URLLC services where only a few TB S values are supported and the network has to rely on a smaller number of physical resource block (PRB) and MCS combinations to schedule the TB. These problems get worse especially when time-domain resource allocation variation cannot be flexibly adjusted due to latency considerations. As a result, the number of combinations of resource allocation (PRB) and MCS can be lower than 10 for smaller TBSs. In other words, all the values in an MCS table cannot be used and the number of usable entries in the MCS table is smaller than the number of spectral efficiency values (e.g., 28) in the MCS table. Therefore, these restrictions\limitations should be mitigated (addressed) prior to CQI reporting enhancements becoming useful. That is, if the MCS cannot be selected based on a reported CQI, it negatively impacts the performance.

In Rel-16 eURLLC work item (WI), a number of new use cases have been discussed, and new requirements, for example, latency targets of 0.5-3 ms and reliability targets from 1E-4 to 1E-7, are being considered. In addition, in Rel-15, the problems associated with 1E-5 CQI reporting and MCS selection to support different block sizes and other reliability targets are known, but left to network implementation. Another major issue is that when scheduling TBS that is different from a reported CQI index is not useful as the variation of block error ratio (BLER) performance at lower to medium code block (CB) sizes can be significant (e.g., only one CB per TB). This may not be a major factor for larger TBSs (e.g., enhanced mobile broadband, eMBB). In other words, TBS assumptions used for CQI estimation can be significantly different from the actual TBS scheduled to the UE. Although, some of these problems may be solved to some extent by implementation choices, e.g., selecting a conservative MCS, such selection can cost in terms of resource utilization by allocating unnecessary lower code rates than required. Thus, the existing CQI framework is not sufficient and/or inefficient to handle URLLC. Therefore, there is a need and/or desire for more efficient CQI reporting mechanism.

The present disclosure describes mechanisms for improved TBS indication and CQI reporting, for example, for lower BLER targets. In an example implementation, for receiving data transmission and/or CQI reporting, a UE may receive an explicit and/or implicit indication to derive (e.g., determine) the TBS instead of using the legacy (e.g., current) TBS determination procedure. The UE, based on the received explicit and/or implicit indication, may perform the following to determine the TBS. For data reception, the UE may ignore the legacy TBS determination procedure and use the received explicit and/or implicit indication to derive the TBS in order receive data transmission with any MCS and resource allocation, where MCS and resource allocation may result in a different TBS than the derived TBS. For CQI reporting, the UE may ignore the traditional TBS given by CSI reference resource and may use the received explicit and/or implicit indication to derive the TBS in order to calculate the CQI.

A method, apparatus, and a computer-readable storage medium are provided for improved transport block size (TBS) indication and channel quality indicator (CQI) reporting for lower target block error ratios (BLERs). In an example implementation, the method may include a user equipment configuring a plurality of transport block sizes, activating one or more transport block sizes of the plurality of transport block sizes, and determining a first transport block size from an indication received from a network node when more than one transport block sizes of the one or more transport block sizes are activated. The method may further include determining, a second transport block size, the second transport block size determined based at least on the one or more transport block sizes that are activated and the first transport block size, and receiving a downlink transmission from the network node with the second transport block size.

In an additional example implementation, the method may include a user equipment determining a channel quality indicator based at least on a physical downlink shared channel received from a network node and transmitting the channel quality indicator to the network node.

Figure 2:
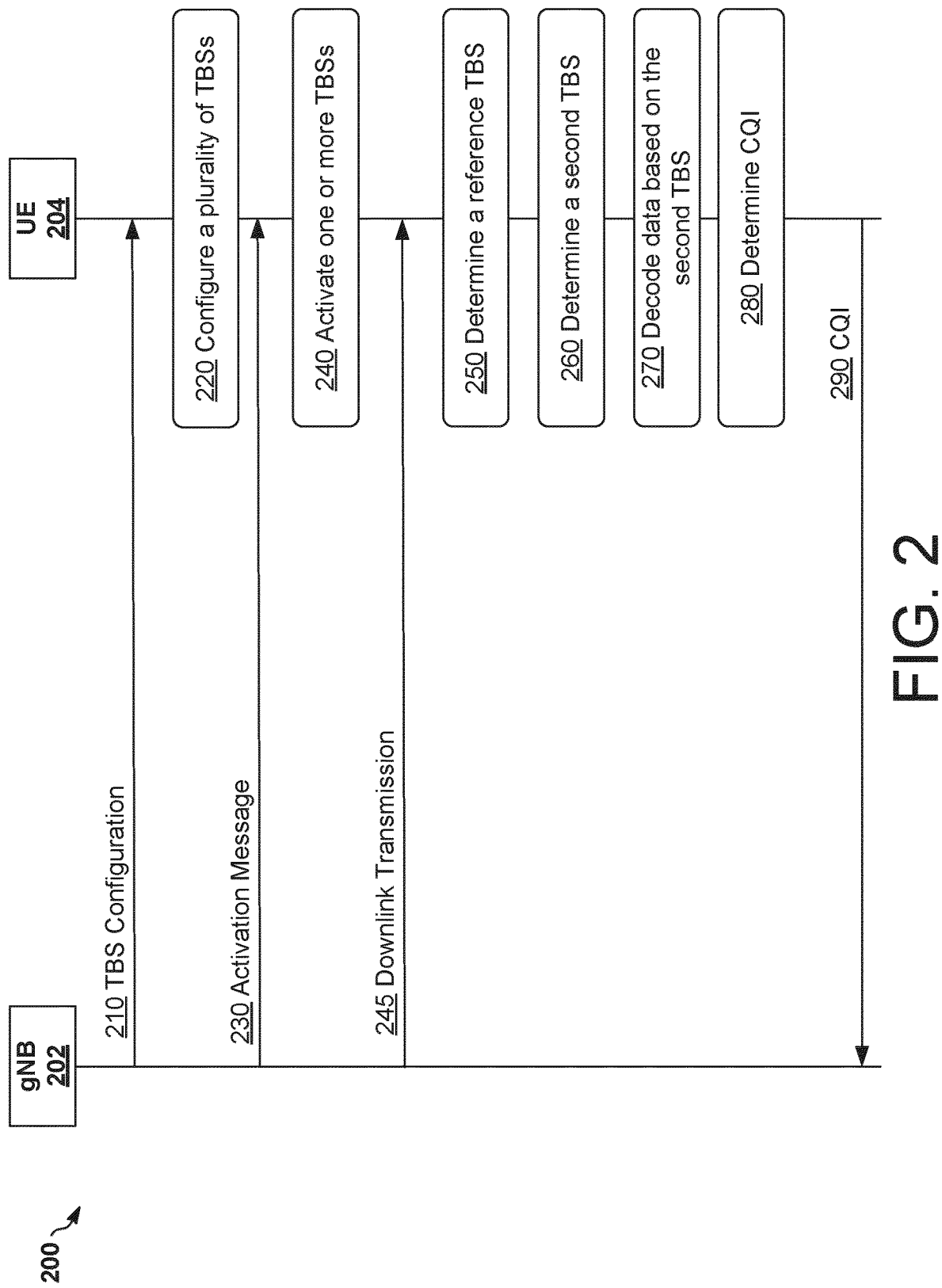
FIG. 2 illustrates an improved (or enhanced) TBS indication and CQI reporting mechanism, according to an example implementation.

FIG. 2 illustrates an improved (or enhanced) TBS indication and CQI reporting mechanism 200, according to an example implementation.

In an example implementation, at 210, a gNB, e.g., gNB 202, which may be same or similar to BS 134 of FIG. 1, may send TBS configuration to a UE, e.g., UE 204, which may be same or similar to user device 131 of FIG. 1. In some implementations, for example, the TBS configuration may indicate a plurality of TBSs to be configured at the UE, where each of the TBSs included in the TBS configuration may be associated with a corresponding target BLER (also referred to as a BLER target), service type/quality of service (QoS), modulation and coding scheme (MCS) table, etc. A BLER may be generally defined as a ratio of a number of erroneous blocks received to a total number of blocks sent. An erroneous block is defined as a TB for which the cyclic redundancy check (CRC) at the UE has failed.

In some implementations, the TBS configuration may be sent to the UE via radio resource control (RRC) signaling, e.g., an RRC message.

At 220, UE 204 may configure a plurality of TBSs. In some implementations, for example, the plurality of TBSs configured at the UE may be based on the TBSs indicated in TBS configuration received from the gNB via RRC signaling. For example, the plurality of TBSs may be illustrated by 310 of FIG. 3 (and further described below in detail in reference to FIG. 3) and may include TBSs 320, 321, 322, 323, 324, 325, 326, 327, 328, and/or 329. The configuration of the TBSs at the UE may be considered as semi-static.

At 230, gNB 202 may send an activation message to the UE. In some implementations, for example, the activation message identifies one or more TBSs (e.g., at least one TBS) of the configured plurality of TBSs to be activated at the UE.

At 240, UE 204 may activate one or more TBSs (e.g., at least one TBS) of the configured plurality of TBSs at the UE. In some implementations, for example, the one or more TBSs activated at the UE may be based on the one or more TBSs indicated in the activation message received from the gNB. In some implementations, for example, the one or more TBSs may be dynamically activated via medium access control control element (MAC-CE) or downlink control information.

In some implementations, for example, the one or more TBSs that are activated at the UE may be illustrated by 330 of FIG. 3 (and further described below in detail in reference to FIG. 3). For example, the one or more TBSs that are activated at the UE may include TBSs 324, 325, 326, and/or 327.

At 245, gNB 202 may send data (e.g., a downlink transmission) to the UE.

At 250, UE 204 may determine a reference TBS. In some implementations, for example, the UE may determine the reference TBS, also referred to as a first TBS, when more than one TBS is activated at the UE. In an example implementation, an indication (e.g., MCS and resource allocation) included in downlink control information (DCI) received from the gNB may be used to determine the reference TBS (out of the more than one activated TBSs) to be used for receiving a downlink transmission (e.g., data reception) from the gNB.

At 260, UE 204 may determine a second TBS, also referred as a derived TBS, for receiving a downlink transmission. In some implementations, for example, the second TBS may be determined at the UE based at least on the activated TBSs and the first TBS. In an example implementation, when more than one TBS is activated at the UE, the UE may determine the second TBS based at least on the reference TBS (e.g., first TBS) determined at 250 and the more than one TBSs activated at the UE. For example, the second TBS may be an activated TBS that is nearest (e.g., smaller or larger) to the reference TBS. In some implementations, for example, the second TBS is determined such that the second TBS is closest to the first TBS when a preconfigured MCS table is used and the preconfigured MCS table is associated with a target BLER or service type supported for the user equipment.

At 270, UE 204 may decode the data (e.g., downlink transmission received at 245) received from the gNB based at least on the second TBS.

At 280, UE 204 may determine a CQI at the UE upon the decoding of the data at the UE. In some implementations, for example, the UE may receive the downlink transmission using the second TBS and determine the CQI based at least on the second TBS. In an example implementation, a CSI-RS transmission from the gNB may be used to determine the CQI along with the second TBS determined at 260. In an additional example implementation, the data transmission of the downlink transmission may be used to determine the CQI.

At 290, UE 204 may transmit the determined CQI to the gNB. In some implementations, for example, the UE may transmit the CQI determined at 280 to the gNB.

In some implementations for example, when at least two TBSs are activated at the UE, the UE may determine CQIs for the lowest TBS and the highest TBS and transmit the CQIs accordingly. In an additional example implementation, the UE may determine a CQI for a TBS that is closest to a TBS scheduled in the latest PDSCH received by the UE.

Furthermore, in some implementations, for example, when the UE activates just one TBS based on the activation message received from the gNB, the UE may receive the downlink transmission from the gNB using the one activated TBS. In other words, when only one TBS is activated at the UE, the UE may skip determining the reference TBS and use the one activated TBS for receiving the downlink transmission and/or for determining the CQI.

Thus, the above described mechanisms provide for improved TBS indication and CQI reporting which may be used for lower target BLERs for efficient signaling.

Figure 3:
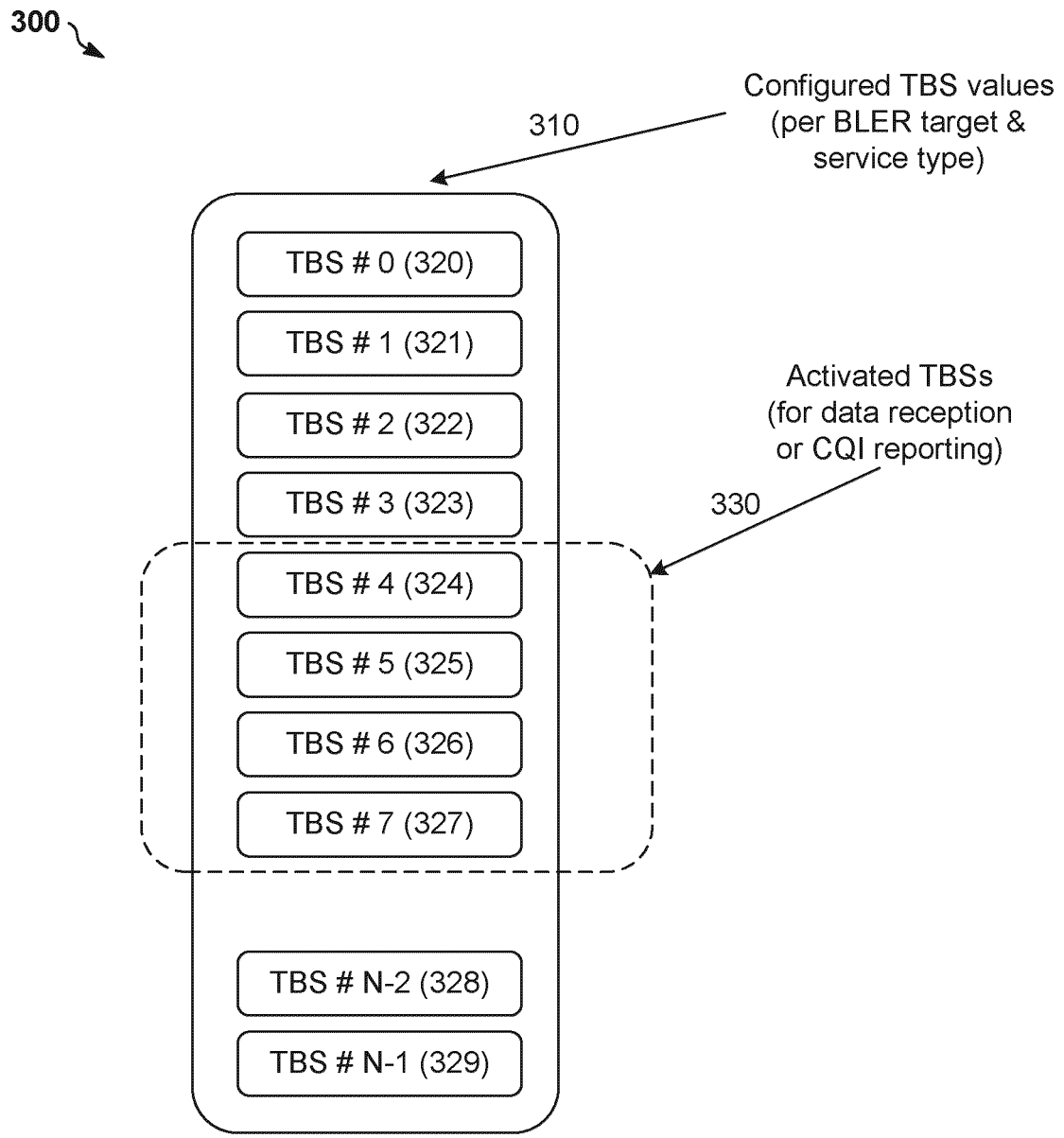
FIG. 3 illustrates configured and/or activated TBS values at a user equipment, according to an example implementation.

FIG. 3 illustrates configured and/or activated TBS values 300 at a user equipment, according to an example implementation.

In an example implementation, FIG. 3 illustrates a plurality of TBS values (e.g., "N" number of TBS values) configured at a UE. The TBSs may include TBS #0 (320), TBS #1 (321), TBS #2 (322), TBS #3 (323), TBS #4 (324), TBS #5 (325), TBS #6 (326), TBS #7 (327), TBS #N−2 (328), and/or TBS #N−1 (329). In some implementations, for example, the TBS values may be configured at the UE based at least on TBS configuration received from the gNB. In an example implementation, the TBS configuration may be received at the UE via radio resource control (RRC), e.g., an RRC message.

In some implementations, for example, each of the TBSs may be associated with a specific target BLER, QoS/service type, etc, and the gNB may send the TBS configuration accordingly based on what needs to be supported at the UE.

In addition, in some implementations, for example, the gNB may activate one or more of the plurality of TBSs that are configured at the UE. In some implementations, for example, the gNB may activate the one or more TBSs, e.g., dynamically, at the UE via a medium access control control element (MAC-CE). The activated TBSs may be used by the UE for receiving downlink transmissions from the gNB. If more than one TBS is activated at the UE via MAC-CE, in some implementations, for example, MCS and resource allocation indicated in a DCI (transmitted in a physical downlink control channel, PDCCH) may be further used to determine the TBS to be used for data reception.

Figure 4:
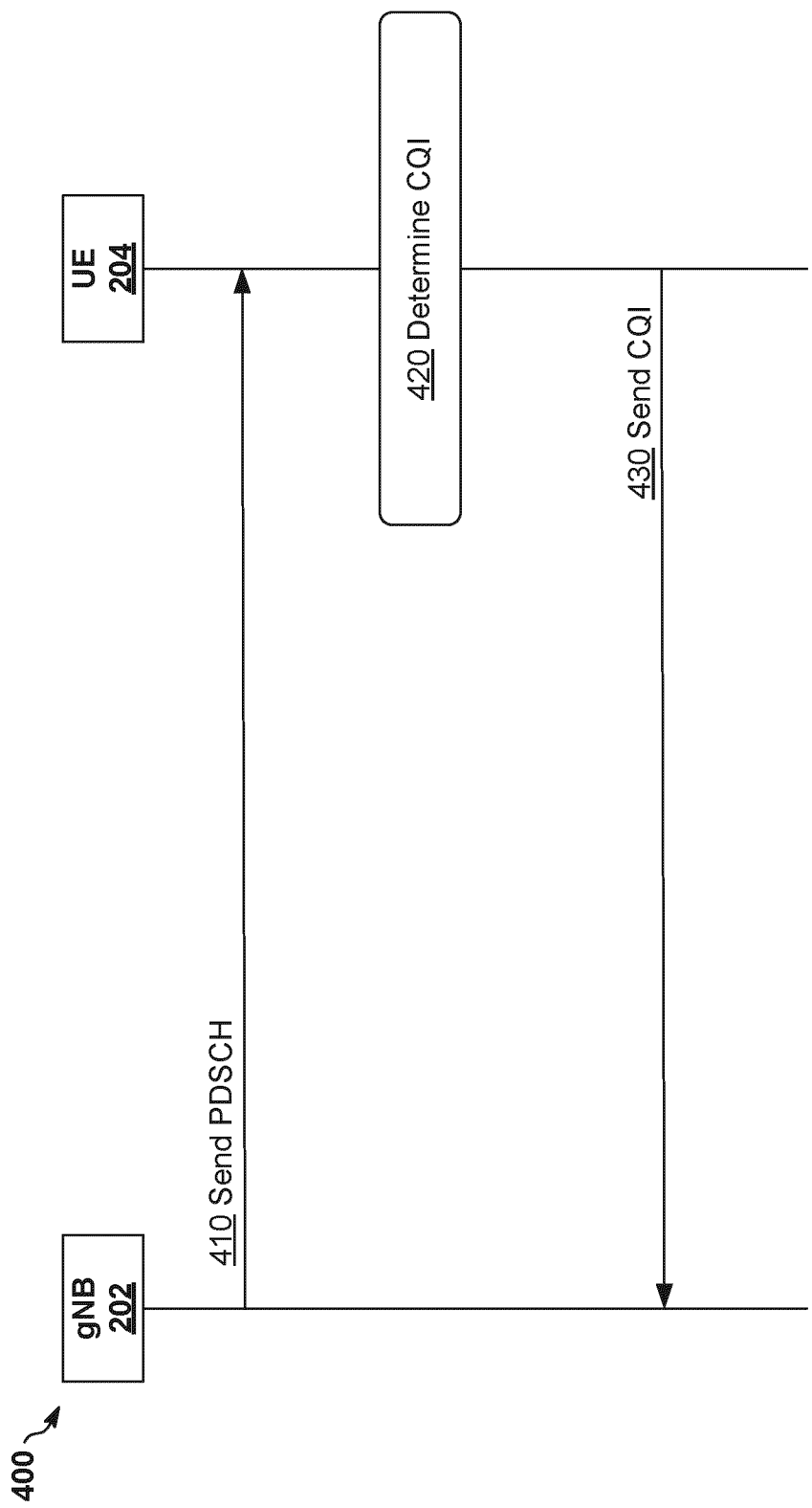
FIG. 4 illustrates an improved CQI reporting mechanism, according to an example implementation.

FIG. 4 illustrates an improved CQI reporting mechanism 400, according to an example implementation.

In an example implementation, at 410, a gNB, e.g., gNB 202, which may be same or similar to BS 134 of FIG. 1, may send a physical downlink shared channel (e.g., PDSCH) to a UE, e.g., UE 204, which may be same or similar to user device 131 of FIG. 1. In NR, a PDSCH, which is shared with other UEs, on a time and frequency basis, may carry data, e.g., user data, UE-specific higher layer control messages mapped down from higher channels, system information blocks (SIBs), paging data, etc., to the UE.

At 420, UE 204 may determine a CQI at the UE. In some implementations, for example, the UE may use the PDSCH received from the gNB as a reference PDSCH.

In some implementations, for example, the PDSCH from the gNB may be received at the UE in the same slot that a CSI-RS resource is received for channel measurements. A CSI reference resource has a fixed size in time and a bandwidth (in frequency) as configured for a corresponding CQI/CSI report. In an additional example implementation, the PDSCH may be received in a later slot (e.g., one or more later slots) than the slot the CSI-RS resource is received for channel measurements. It should be noted that the reference PDSCH is just an example implementation and anything that is defined in 3GPP Specifications or related to a CSI-RS may be used (as a reference) instead of the reference PDSCH.

In some implementations, for example, the reference PDSCH, which may be an initial PDSCH transmission and the ACK/NACK for the decoded TB may be further used to adjust the CQI index which may have been derived based on the legacy (or modified) CSI reference resource.

In some implementations, for example, once the UE has determined the CQI, it may be adjusted by the UE in several ways for an improved CQI reporting mechanism. In an example implementation, the CQI may be adjusted to at least one higher CQI index if the reference PDSCH is successfully decoded and the CQI has a lower spectral efficiency than the PDSCH. In an additional example implementation, the CQI may be adjusted to a lower CQI index or kept the same if the PDSCH is successfully decoded and the CQI has a higher spectral efficiency than the PDSCH. In another additional example implementation, the no adjustments may be made to the CQI if the PDSCH is not successfully decoded and the CQI has a lower spectral efficiency than the PDSCH. In another additional example implementation, the CQI may be adjusted to at least one lower CQI index value if the PDSCH is not successfully decoded and the CQI has a higher spectral efficiency than the PDSCH.

In addition, in some implementations, for example, both CSI reference resource and reference PDSCH may be used to determine the CQI index for CQI reporting. For example, if the TBS that is determined from CSI-reference resource indicates a different CQI than the TBS that is determined from the reference PDSCH, the UE may report both CQI indexes, or lowest CQI index, or only the CQI index determined based on the reference PDSCH, and the reporting may be configured at the UE via higher layers.

Further, in some implementations, for example, the CSI reference resource may be replaced by the reference PDSCH, and may be defined in the 3GPP Specification. Furthermore, in some implementations, for example, the parameters defined for CSI reference resource may be modified (e.g., at least partly) to reflect the reference PDSCH assumptions. For example, the number of DMRS symbols in the CSI reference resource may be defined to be equal to the reference PDSCH DMRS symbols, the number of PRBs may be determined from the reference PDSCH, and/or any other related parameters may modify the CSI reference resource.

At 430, UE 204 may send a CQI to the gNB. In some implementations, for example, the UE may send the CQI determined as described above in any combination of the implementations to the gNB.

Thus, the above described mechanisms for improved CQI reporting which may be used for lower target BLERs for efficient signaling.

Figure 5:
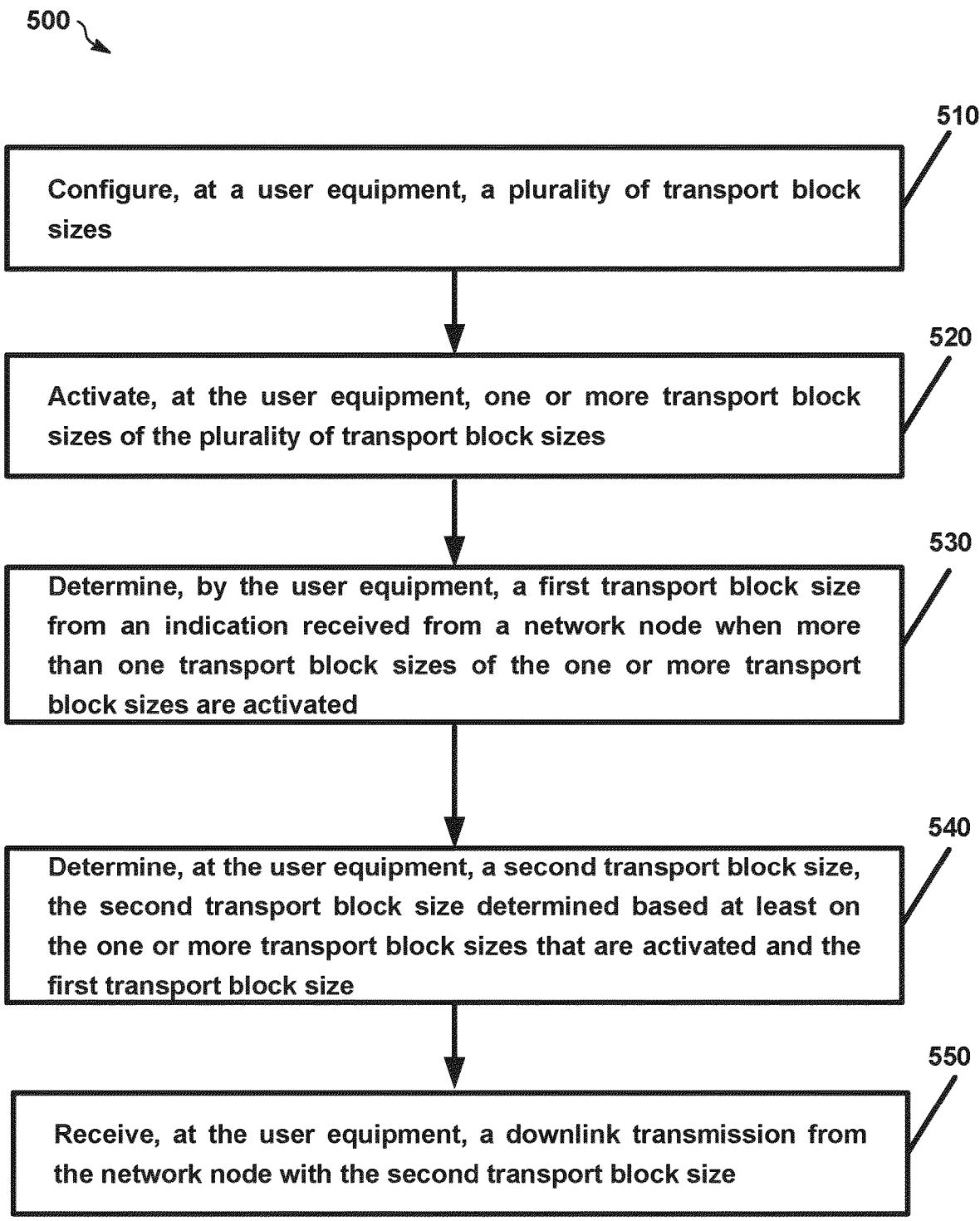
FIG. 5 is a flow chart illustrating an improved CQI reporting mechanism, according to an example implementation.

FIG. 5 is a flow chart 500 illustrating an improved TBS indication and CQI reporting mechanism, according to an example implementation.

In an example implementation, at block 510, a UE, e.g., UE 204, may configure a plurality of TBSs at the UE. In some implementations, for example, the UE may configure TBSs 320, 321, 322, 323, 324, 325, 326, 327, 328, and/or 329 based at least on the TBS configuration received via RRC from the gNB.

At block 520, UE 204 may activate one or more TBSs of the plurality of TBSs configured at the UE. In some implementations, for example, the UE may activate TBSs 324, 325, 326, and/or 327 at the UE. In an example implementation, the TBSs may be activated via a MAC-CE message, e.g., an activation message, received from the gNB.

At block 530, UE 204 may determine a first TBS from an indication received from a network node when more than one TBSs of the one or more TBSs are activated at the UE. In some implementations, for example, the UE may determine a reference TBS when at least two TBSs (e.g., TBSs 324, 325, 326, and/or 327 are activated at the UE).

At block 540, UE 204 may determine a second TBS based at least on the one or more TBSs that are activated and the reference TBS. In some implementations, for example, the UE may determine the TBS for receiving the downlink transmission from the gNB based at least on the reference TBSs and the activated TBSs.

In an example implementation, the UE may determine that TBS #6 (326) as the second TBS based on the TBS 326 being activated at the UE and nearest to the reference TBS.

At block 550, UE 204 may receive a downlink transmission from the gNB using the second TBS. In some implementations, for example, UE 204 may receive the downlink transmission using TBS #6 (326).

Optionally, in some implementations, for example, UE 204 may report the determined CQI to the gNB.

Thus, the above described mechanisms provide for improved TBS indication and CQI reporting which may be used for lower target BLERs for efficient signaling.

Figure 6:
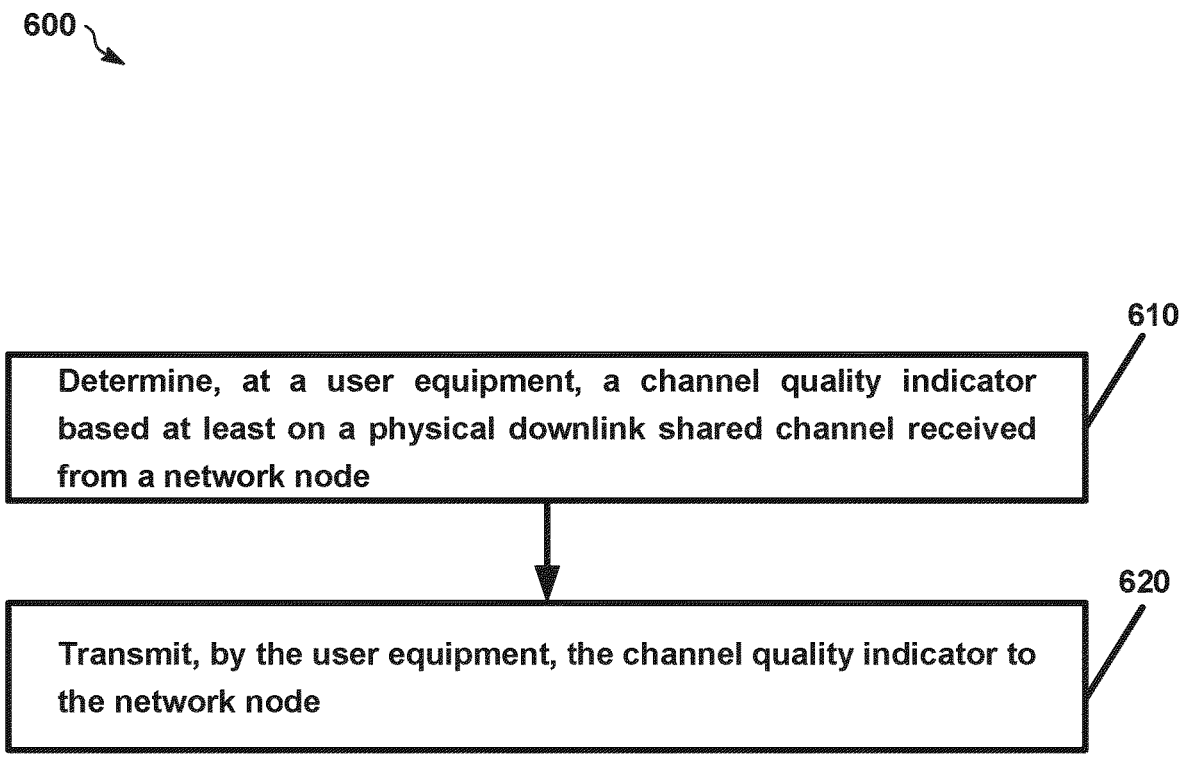
FIG. 6 is a flow chart illustrating an improved CQI reporting mechanism, according to an example implementation.

FIG. 6 is a flow chart 600 illustrating an improved CQI reporting mechanism, according to an example implementation.

In an example implementation, at block 610, a UE, e.g., UE 204, may determine a CQI based at least on a PDSCH received from a network node. In some implementations, the UE may determine the CQI using the PDSCH received by the UE in the same slot (or a later slot) as a reference (e.g., as a reference PDSCH).

At block 620, UE 204 may transmit the CQI to the network node, e.g., gNB 202. In some implementations, for example, the UE may transmit the CQI determined based at least on the reference PDSCH to the gNB.

Thus, the above described mechanisms for improved CQI reporting which may be used for lower target BLERs for efficient signaling.

Figure 7:
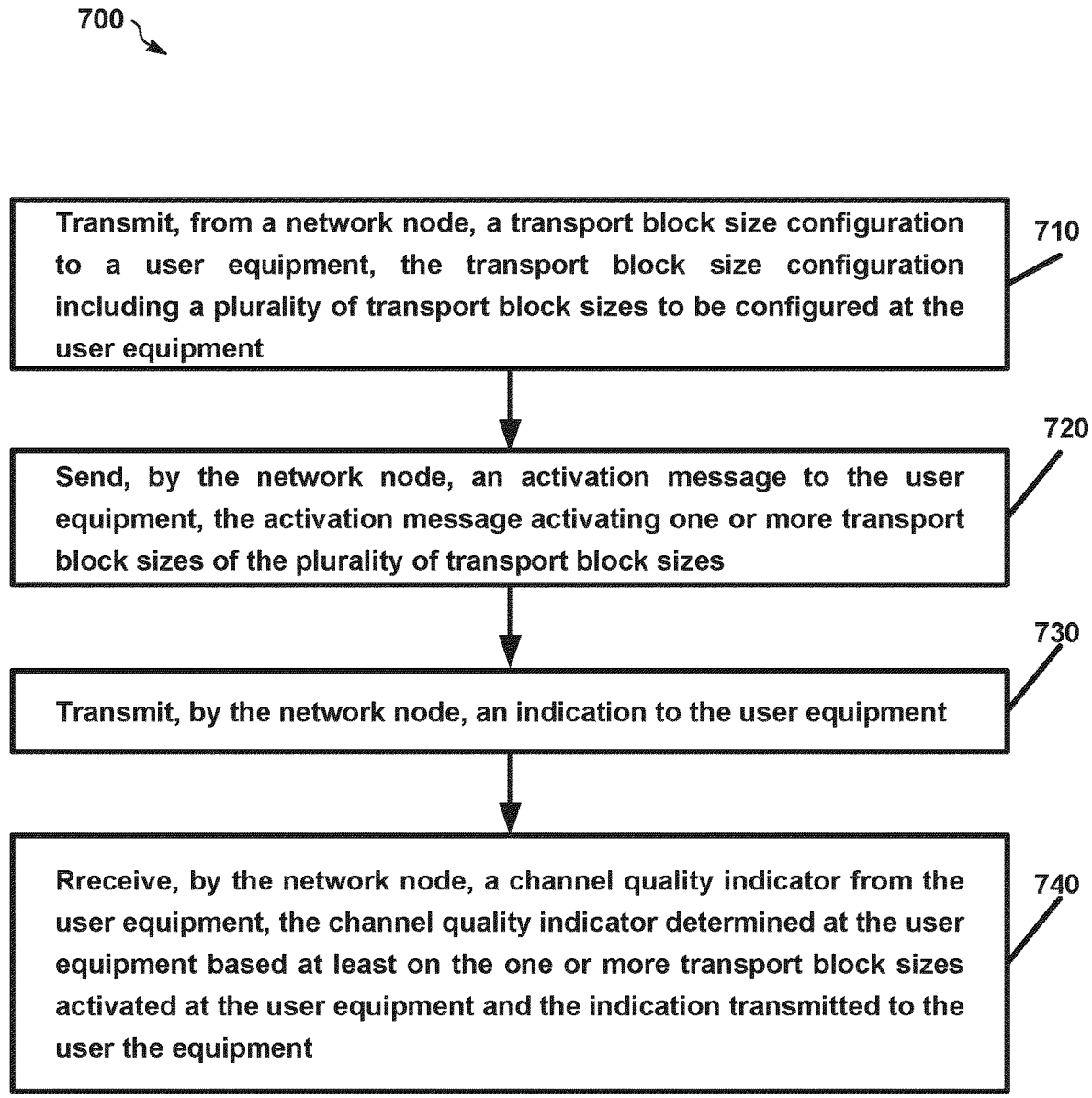
FIG. 7 is a flow chart illustrating an improved TBS indication and CQI reporting mechanism, according to an example implementation.

FIG. 7 is a flow chart 700 illustrating an improved TBS indication and CQI reporting mechanism, according to an example implementation.

In an example implementation, at block 710, a gNB, e.g., gNB 202 may transmit a TBS configuration to a UE, e.g., UE 204. In some implementations, for example, the TBS configuration may include a plurality of TBSs (e.g., TBSs 320, 321, 322, 323, 324, 325, 326, 327, 328, and/or 329) to be configured at the user equipment.

At block 720, gNB 204 may send an activation message to the UE. In some implementations, for example, the activation message may activate one or more TBSs, e.g., TBSs 324, 325, 326, and/or 327 at the UE.

At block 730, gNB 204 may transmit an indication to the user equipment. For example, in some implementations, the gNB may transmit a DCI, which may include MCS and resource allocation, to the UE.

At block 740, gNB 202 may receive a CQI from the UE. In some implementations, for example, the CQI determined at the UE may be based at least on the activated TBSs and the indication transmitted to the user the equipment.

Thus, the above described mechanisms provide for improved TBS indication and CQI reporting which may be used for lower target BLERs for efficient signaling.

Additional example implementations are described herein.

Example 1. A method of communications, comprising: configuring, at a user equipment, a plurality of transport block sizes; activating, at the user equipment, one or more transport block sizes of the plurality of transport block sizes; determining, at the user equipment, a first transport block size from an indication received from a network node when more than one transport block sizes of the one or more transport block sizes are activated; determining, at the user equipment, a second transport block size, the second transport block size determined based at least on the one or more transport block sizes that are activated and the first transport block size; and receiving, at the user equipment, a downlink transmission from the network node with the second transport block size.

Example 2. The method of Example 1, further comprising: receiving a transport block size configuration from the network node, the transport block size configuration including the plurality of transport block sizes.

Example 3. The method of Example 2, wherein the transport block size configuration is received via a radio resource control message from the network node.

Example 4. The method of any of Examples 1-3, further comprising: receiving an activation message from the network node, the activation message identifying the one or more transport block sizes to be activated at the user equipment.

Example 5. The method of any of Examples 1-4, wherein the one or more transport block sizes are dynamically activated via a medium access control (MAC) control element or downlink control information.

Example 6. The method of any of Examples 1-5, wherein the indication includes downlink control information.

Example 7. The method of Example 6, wherein the downlink control information further includes at least a modulation and coding scheme and allocated resources that are used for determining the first transport block size.

Example 8. The method of any of Examples 1-7, wherein the second transport block size is determined from the one or more transport block sizes that are activated such that the second transport block size is closest to the first transport block size.

Example 9. The method of any of Examples 1-8, wherein the second transport block size is determined such that the second transport block size is closest to the first transport block size when using a preconfigured modulation and coding scheme table, and wherein the preconfigured modulation and coding scheme table is associated with a block error rate target or service type supported for the user equipment.

Example 10. The method of any of Examples 1-9, wherein the activating includes activating one transport block size, and wherein the receiving further includes receiving the downlink transmission from the network node using the one activated transport block size.

Example 11. The method of any of Examples 1-10, wherein the one or more activated transport block sizes are used for determining a channel quality indicator at the user equipment.

Example 12. The method of Example 11, further comprising: transmitting the channel quality indicator to the network node, the channel quality indicator determined based at least on the second transport block size.

Example 13. The method of Example 12, wherein the activating includes activating at least two transport block sizes, and wherein the transmitting the channel quality indicator further comprises: transmitting channel quality indicators for at least a smallest transport block size and/or a highest transport block size value of the activated transport block sizes.

Example 14. The method of Example 12, wherein the activating includes activating at least two transport block sizes, and wherein the transmitting the channel quality indicator further comprises: transmitting a channel quality indicator for a transport block size that is closest to a transport block size scheduled in a latest physical downlink shared channel received by the user equipment.

Example 15. The method of Example 12, wherein the activating includes activating one transport block size, and wherein the transmitting the channel quality indicator further comprises: transmitting the channel quality indicator for the activated transport block size.

Example 16. A method of communications, comprising: determining, at a user equipment, a channel quality indicator based at least on a physical downlink shared channel received from a network node; and transmitting, by the user equipment, the channel quality indicator to the network node.

Example 17. The method of Example 16, wherein the physical downlink shared channel is received in a same slot or any later slot in which a channel state information reference signal used for determining the channel quality indicator is received.

Example 18. The method of Example 17, wherein the slot is configured by the network node.

Example 19. The method of any of Examples 16-18, wherein the determining the channel quality indicator based at least on the physical downlink shared channel further comprises at least one of: adjusting the channel quality indicator to at least one higher channel quality indicator index if the physical downlink shared channel is successfully decoded and the channel quality indicator has a lower spectral efficiency than the physical downlink shared channel; adjusting the channel quality indicator to a same or lower channel quality indicator index if the physical downlink shared channel is successfully decoded and the channel quality indicator has a higher spectral efficiency than the physical downlink shared channel; performing no adjustments to the channel quality indicator if the physical downlink shared channel is not successfully decoded and the channel quality indicator has a lower spectral efficiency than the physical downlink shared channel; and adjusting the channel quality indicator to a channel quality indicator lower index value if the physical downlink shared channel is not successfully decoded and the channel quality indicator has a higher spectral efficiency than the physical downlink shared channel.

Example 20. A method of communications, comprising: transmitting, from a network node, a transport block size configuration to a user equipment, the transport block size configuration including a plurality of transport block sizes to be configured at the user equipment; sending, by the network node, an activation message to the user equipment, the activation message activating one or more transport block sizes of the plurality of transport block sizes; transmitting, by the network node, an indication to the user equipment; and receiving, by the network node, a channel quality indicator from the user equipment, the channel quality indicator determined at the user equipment based at least on the one or more transport block sizes activated at the user equipment and the indication transmitted to the user the equipment.

Example 21. The method of Example 20, wherein the transport block size configuration is transmitted via a radio resource control message to the user equipment.

Example 22. The method of any of Examples 20-21, wherein the one or more transport block sizes are dynamically activated via a medium access control (MAC) control element or downlink control information.

Example 23. The method of Example 22, wherein the indication includes downlink control information.

Example 24. The method of any of Examples 22-23, wherein the downlink control information further includes at least a modulation and coding scheme and allocated resources.

Example 25. The method of any of Examples 20-24, wherein the network node is a gNB.

Example 26. A non-transitory computer-readable storage medium comprising instructions stored thereon that, when executed by at least one processor, are configured to cause a computing system to perform the method of any of Examples 1-25.

Example 27. An apparatus comprising at least one processor and at least one memory including computer program code, the at least one memory and the computer program code configured to, with the at least one processor, cause the apparatus to at least perform: configuring, at a user equipment, a plurality of transport block sizes; activating, at the user equipment, one or more transport block sizes of the plurality of transport block sizes; determining, at the user equipment, a first transport block size from an indication received from a network node when more than one transport block sizes of the one or more transport block sizes are activated; determining, at the user equipment, a second transport block size, the second transport block size determined based at least on the one or more transport block sizes that are activated and the first transport block size; and receiving, at the user equipment, a downlink transmission from the network node with the second transport block size.

Example 28. The apparatus of Example 27, further configured to: receiving a transport block size configuration from the network node, the transport block size configuration including the plurality of transport block sizes.

Example 29. The apparatus of Example 28, wherein the transport block size configuration is received via a radio resource control message from the network node.

Example 30. The apparatus of any of Examples 26-29, further configured to: receiving an activation message from the network node, the activation message identifying the one or more transport block sizes to be activated at the user equipment.

Example 31. The apparatus of any of Examples 26-30, wherein the one or more transport block sizes are dynamically activated via a medium access control (MAC) control element or downlink control information.

Example 32. The apparatus of any of Examples 26-31, wherein the indication includes downlink control information.

Example 33. The apparatus of Example 32, wherein the downlink control information further includes at least a modulation and coding scheme and allocated resources that are used for determining the first transport block size.

Example 34. The apparatus of any of Examples 26-33, wherein the second transport block size is determined from the one or more transport block sizes that are activated such that the second transport block size is closest to the first transport block size.

Example 35. The apparatus of any of Examples 26-34, wherein the second transport block size is determined such that the second transport block size is closest to the first transport block size when using a preconfigured modulation and coding scheme table, and wherein the preconfigured modulation and coding scheme table is associated with a block error rate target or service type supported for the user equipment.

Example 36. The apparatus of any of Examples 26-35, wherein the activating includes activating one transport block size, and wherein the receiving further includes receiving the downlink transmission from the network node using the one activated transport block size.

Example 37. The apparatus of any of Examples 26-36, wherein the one or more activated transport block sizes are used for determining a channel quality indicator at the user equipment.

Example 38. The apparatus of Example 37, further configured to: transmitting the channel quality indicator to the network node, the channel quality indicator determined based at least on the second transport block size.

Example 39. The apparatus of Example 38, wherein the activating includes activating at least two transport block sizes, and wherein the transmitting the channel quality indicator further comprises: transmitting channel quality indicators for at least a smallest transport block size and/or a highest transport block size value of the activated transport block sizes.

Example 40. The apparatus of Example 38, wherein the activating includes activating at least two transport block sizes, and wherein the transmitting the channel quality indicator further comprises: transmitting a channel quality indicator for a transport block size that is closest to a transport block size scheduled in a latest physical downlink shared channel received by the user equipment.

Example 41. The apparatus of Example 38, wherein the activating includes activating one transport block size, and wherein the transmitting the channel quality indicator further comprises: transmitting the channel quality indicator for the activated transport block size.

Example 42. An apparatus comprising at least one processor and at least one memory including computer program code, the at least one memory and the computer program code configured to, with the at least one processor, cause the apparatus to at least perform: determining, at a user equipment, a channel quality indicator based at least on a physical downlink shared channel received from a network node; and transmitting, by the user equipment, the channel quality indicator to the network node.

Example 43. The apparatus of Example 42, wherein the physical downlink shared channel is received in a same slot or any later slot in which a channel state information reference signal used for determining the channel quality indicator is received.

Example 44. The apparatus of Example 43, wherein the slot is configured by the network node.

Example 45. The apparatus of any of Examples 42-44, wherein the determining the channel quality indicator based at least on the physical downlink shared channel further comprises at least one of: adjusting the channel quality indicator to at least one higher channel quality indicator index if the physical downlink shared channel is successfully decoded and the channel quality indicator has a lower spectral efficiency than the physical downlink shared channel; adjusting the channel quality indicator to a same or lower channel quality indicator index if the physical downlink shared channel is successfully decoded and the channel quality indicator has a higher spectral efficiency than the physical downlink shared channel; performing no adjustments to the channel quality indicator if the physical downlink shared channel is not successfully decoded and the channel quality indicator has a lower spectral efficiency than the physical downlink shared channel; and adjusting the channel quality indicator to a channel quality indicator lower index value if the physical downlink shared channel is not successfully decoded and the channel quality indicator has a higher spectral efficiency than the physical downlink shared channel.

Example 46. An apparatus comprising at least one processor and at least one memory including computer program code, the at least one memory and the computer program code configured to, with the at least one processor, cause the apparatus to at least perform: transmitting, from a network node, a transport block size configuration to a user equipment, the transport block size configuration including a plurality of transport block sizes to be configured at the user equipment; sending, by the network node, an activation message to the user equipment, the activation message activating one or more transport block sizes of the plurality of transport block sizes; transmitting, by the network node, an indication to the user equipment; and receiving, by the network node, a channel quality indicator from the user equipment, the channel quality indicator determined at the user equipment based at least on the one or more transport block sizes activated at the user equipment and the indication transmitted to the user the equipment.

Example 47. The apparatus of Example 46, wherein the transport block size configuration is transmitted via a radio resource control message to the user equipment.

Example 48. The apparatus of any of Examples 46-47, wherein the one or more transport block sizes are dynamically activated via a medium access control (MAC) control element or downlink control information.

Example 49. The apparatus of Example 48, wherein the indication includes downlink control information.

Example 50. The apparatus of any of Examples 48-49, wherein the downlink control information further includes at least a modulation and coding scheme and allocated resources.

Example 51. The apparatus of any of Examples 46-50, wherein the network node is a gNB.

Example 52. An apparatus comprising means for at least performing: configuring, at a user equipment, a plurality of transport block sizes; activating, at the user equipment, one or more transport block sizes of the plurality of transport block sizes; determining, at the user equipment, a first transport block size from an indication received from a network node when more than one transport block sizes of the one or more transport block sizes are activated; determining, at the user equipment, a second transport block size, the second transport block size determined based at least on the one or more transport block sizes that are activated and the first transport block size; and receiving, at the user equipment, a downlink transmission from the network node with the second transport block size.

Example 53. The apparatus of Example 52, further comprising means for: receiving a transport block size configuration from the network node, the transport block size configuration including the plurality of transport block sizes.

Example 54. The apparatus of Example 53, wherein the transport block size configuration is received via a radio resource control message from the network node.

Example 55. The apparatus of any of Examples 52-54, further comprising means for: receiving an activation message from the network node, the activation message identifying the one or more transport block sizes to be activated at the user equipment.

Example 56. The apparatus of any of Examples 52-55, wherein the one or more transport block sizes are dynamically activated via a medium access control (MAC) control element or downlink control information.

Example 57. The apparatus of any of Examples 52-56, wherein the indication includes downlink control information.

Example 58. The apparatus of Example 57, wherein the downlink control information further includes at least a modulation and coding scheme and allocated resources that are used for determining the first transport block size.

Example 59. The apparatus of any of Examples 52-58, wherein the second transport block size is determined from the one or more transport block sizes that are activated such that the second transport block size is closest to the first transport block size.

Example 60. The apparatus of any of Examples 52-59, wherein the second transport block size is determined such that the second transport block size is closest to the first transport block size when using a preconfigured modulation and coding scheme table, and wherein the preconfigured modulation and coding scheme table is associated with a block error rate target or service type supported for the user equipment.

Example 61. The apparatus of any of Examples 52-60, wherein the activating includes activating one transport block size, and wherein the receiving further includes receiving the downlink transmission from the network node using the one activated transport block size.

Example 62. The apparatus of any of Examples 52-61, wherein the one or more activated transport block sizes are used for determining a channel quality indicator at the user equipment.

Example 63. The apparatus of Example 62, further comprising means for: transmitting the channel quality indicator to the network node, the channel quality indicator determined based at least on the second transport block size.

Example 64. The apparatus of Example 63, wherein the activating includes activating at least two transport block sizes, and wherein the transmitting the channel quality indicator further comprises: transmitting channel quality indicators for at least a smallest transport block size and/or a highest transport block size value of the activated transport block sizes.

Example 65. The apparatus of Example 63, wherein the activating includes activating at least two transport block sizes, and wherein the transmitting the channel quality indicator further comprises: transmitting a channel quality indicator for a transport block size that is closest to a transport block size scheduled in a latest physical downlink shared channel received by the user equipment.

Example 66. The apparatus of Example 63, wherein the activating includes activating one transport block size, and wherein the transmitting the channel quality indicator further comprises: transmitting the channel quality indicator for the activated transport block size.

Example 67. An apparatus comprising means for at least performing: determining, at a user equipment, a channel quality indicator based at least on a physical downlink shared channel received from a network node; and transmitting, by the user equipment, the channel quality indicator to the network node.

Example 68. The apparatus of Example 67, wherein the physical downlink shared channel is received in a same slot or any later slot in which a channel state information reference signal used for determining the channel quality indicator is received.

Example 69. The apparatus of Example 68, wherein the slot is configured by the network node.

Example 70. The apparatus of any of Examples 67-69, wherein the determining the channel quality indicator based at least on the physical downlink shared channel further comprises at least one of: adjusting the channel quality indicator to at least one higher channel quality indicator index if the physical downlink shared channel is successfully decoded and the channel quality indicator has a lower spectral efficiency than the physical downlink shared channel; adjusting the channel quality indicator to a same or lower channel quality indicator index if the physical downlink shared channel is successfully decoded and the channel quality indicator has a higher spectral efficiency than the physical downlink shared channel; performing no adjustments to the channel quality indicator if the physical downlink shared channel is not successfully decoded and the channel quality indicator has a lower spectral efficiency than the physical downlink shared channel; and adjusting the channel quality indicator to a channel quality indicator lower index value if the physical downlink shared channel is not successfully decoded and the channel quality indicator has a higher spectral efficiency than the physical downlink shared channel.

Example 71. An apparatus comprising means for at least performing: transmitting, from a network node, a transport block size configuration to a user equipment, the transport block size configuration including a plurality of transport block sizes to be configured at the user equipment; sending, by the network node, an activation message to the user equipment, the activation message activating one or more transport block sizes of the plurality of transport block sizes; transmitting, by the network node, an indication to the user equipment; and receiving, by the network node, a channel quality indicator from the user equipment, the channel quality indicator determined at the user equipment based at least on the one or more transport block sizes activated at the user equipment and the indication transmitted to the user the equipment.

Example 72. The apparatus of Example 71, wherein the transport block size configuration is transmitted via a radio resource control message to the user equipment.

Example 73. The apparatus of any of Examples 71-72, wherein the one or more transport block sizes are dynamically activated via a medium access control (MAC) control element or downlink control information.

Example 74. The apparatus of Example 72, wherein the indication includes downlink control information.

Example 75. The apparatus of any of Examples 73-74, wherein the downlink control information further includes at least a modulation and coding scheme and allocated resources.

Example 76. The apparatus of any of Examples 71-75, wherein the network node is a gNB.

Figure 8:
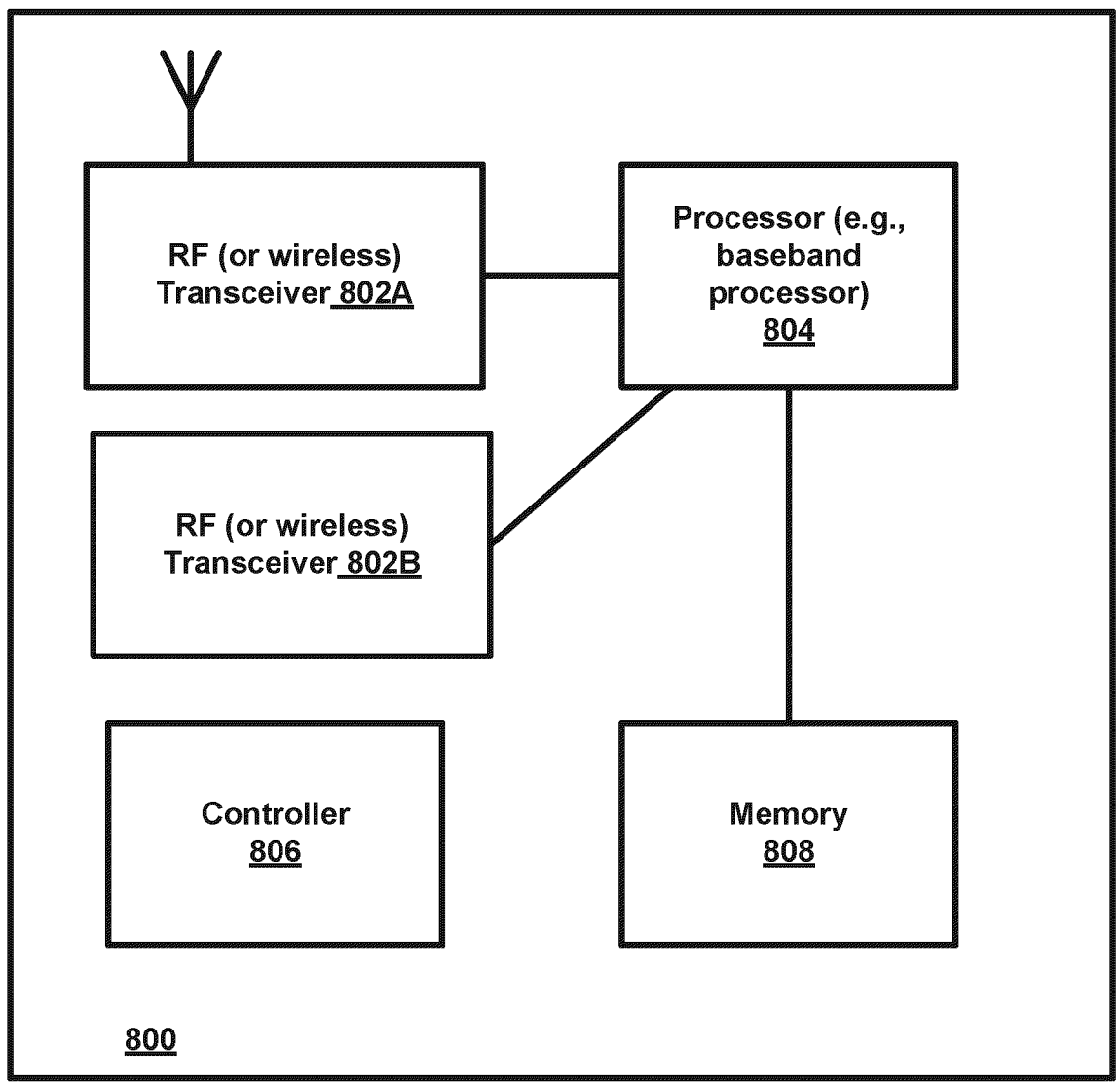
FIG. 8 is a block diagram of a node or wireless station (e.g., base station/access point or mobile station/user device/UE), according to an example implementation.

FIG. 8 is a block diagram of a wireless station (e.g., user equipment (UE)/user device or AP/gNB/MgNB/SgNB) 800 according to an example implementation. The wireless station 800 may include, for example, one or more RF (radio frequency) or wireless transceivers 802A, 802B, where each wireless transceiver includes a transmitter to transmit signals and a receiver to receive signals. The wireless station also includes a processor or control unit/entity (controller) 804/806 to execute instructions or software and control transmission and receptions of signals, and a memory 808 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller 806 (or processor 804) may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software. Moreover, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semi-conductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. An apparatus comprising at least one processor and at least one memory including computer program code, the at least one memory and the computer program code configured to, with the at least one processor, cause the apparatus to at least perform:
receiving a transport block size configuration from a network node, the transport block size configuration including a plurality of transport block sizes, wherein the transport block size configuration is received via a radio resource control (RRC) message;
configuring the plurality of transport block sizes based on the transport block size configuration;
receiving an activation message from the network node, the activation message identifying one or more transport block sizes to be activated;
activating one or more transport block sizes of the plurality of transport block sizes based on the activation message, wherein the one or more activated transport block sizes are used for determining a channel quality indicator, and wherein the activating includes activating at least a first transport block size and a second transport block size;

determining the first transport block size from an indication received from the network node when more than one transport block sizes of the one or more transport block sizes are activated, wherein the indication includes downlink control information, wherein the downlink control information includes at least a preconfigured modulation and coding scheme and allocated resources that are used for determining the first transport block size;

determining the second transport block size, the second transport block size determined based at least on the one or more transport block sizes that are activated and the first transport block size, wherein the second transport block size is determined such that the second transport block size is closest to the first transport block size when using the preconfigured modulation and coding scheme, and wherein the preconfigured modulation and coding scheme is associated with a block error rate target or service type supported;

receiving a downlink transmission from the network node with the second transport block size; and transmitting channel quality indicators for at least a smallest transport block size, a highest transport block size value of the activated transport block sizes, and a transport block size of the plurality of transport block sizes closest to a transport block size scheduled in a latest physical downlink shared channel (PDSCH) received from the network node.

\* \* \* \* \*